June 21, 1960  H. W. CHRISTENSON ET AL  2,941,639
CLUTCH AND BRAKE FOR STEERING VEHICLE
Filed April 30, 1956  2 Sheets-Sheet 2

INVENTORS
Howard W. Christenson &
BY Ulysses A. Brefing
T. L. Chisholm
ATTORNEY

United States Patent Office 2,941,639
Patented June 21, 1960

2,941,639

CLUTCH AND BRAKE FOR STEERING VEHICLE

Howard W. Christenson and Ulysses A. Breting, Indianapolis, Ind., assignors to General Motors Corporation, Detroit, Mich., a corporation of Delaware Filed Apr. 30, 1956, Ser. No. 581,654

25 Claims. (Cl. 192—13)

This invention relates to a transmission and more particularly to a final drive transmission having right-and-left-hand driving and steering clutches and brakes.

The final drive transmission has a cross shaft which may be connected to either or both of the driving wheels by the right-and-left-hand driving and steering clutches. The wheels may also be simultaneously or individually braked by the right-and-left-hand hydraulically or mechanically actuated wheel brakes. The hydraulic control system employs right-and-left-hand control valves which may be manually actuated together to hydraulically control both clutch and brake units or independently to control the selected clutch and brake unit. Each control valve unit is connected to the respective clutch and brake unit to normally engage the clutch and release the brake. The valve may then be actuated to release the clutch and apply the brake. Progressive movement of the valve unit regulates the clutch pressure at a progressively lower value until in the neutral valve position, the clutch and brake are released. Further movement of the valve unit supplies fluid at a regulated pressure which increases with valve movement to apply the brake until in the final valve position the brake is fully applied.

The pressure initially supplied to the clutch is regulated by a trimmer valve which supplies a gradually increasing pressure to the clutch in accordance with the pressure supplied by the control valve and the time this pressure is supplied in order to avoid sudden and jarring engagements of the driving clutch. To provide vehicle braking and steering in the event of engine or hydraulic system failure, the brakes may also be manually operated by a mechanical actuator.

An object of the invention is to provide in a final drive transmission a cross shaft connected by driving and steering clutches to each wheel and a brake for each wheel, a control system operable to regulate the clutch pressure at a selected value and to regulate the brake pressure at a selected value.

Another object of the invention is to provide in a final drive transmission having a cross shaft connected at each end by a clutch to the wheels and a brake for each wheel, the control system normally supplying fluid line pressure to the clutches and controllable to reduce the pressure to the clutches and to regulate the pressure at any reduced value and also controllable to supply full line pressure to the brake and to regulate the brake pressure at any intermediate value.

Another object of the invention is to provide in a final drive transmission having a shaft connected by a clutch for driving and steering each wheel and the brake connected to stop each wheel, a transmission control system selectively operable to actuate either the right-or-left-hand clutch and brake independently or in unison which normally supplies full line pressure to the clutches and is regulatable to supply any intermediate pressure to said clutches and to supply any intermediate regulated pressure or full line pressure to said brake.

Another object of the invention is to provide in a control system having a pair of alternately operable fluid motors, a control valve unit normally supplying full line pressure to one fluid motor and movable progressively to regulate the pressure supplied to the one motor at progressively reduced values, to exhaust both motors and to regulate the pressure supplied to the other motor at increasing values, until full line pressure is supplied to the other motor.

Another object of the invention is to provide in a transmission having a fluid motor and a regulating control valve controlling the supply and pressure of fluid delivered to the motor, a second regulating valve to regulate the supply of fluid to the motor so that the pressure increases in accordance with the pressure and the duration of the fluid supplied to the motor.

Another object of the invention is to provide in a transmission having a fluid motor for establishing a driving connection and a regulating control valve for supplying pressure to the fluid motor, a second regulating valve to further control the supply of fluid to the fluid motor between a minimum pressure and a maximum pressure in accordance with the pressure of the fluid supplied and the length of time the fluid is supplied to the motor.

These and other objects of the invention will be more apparent to those skilled in the art from the following description of the preferred embodiment of the invention illustrated in the accompanying drawings in which.

Figure 1:
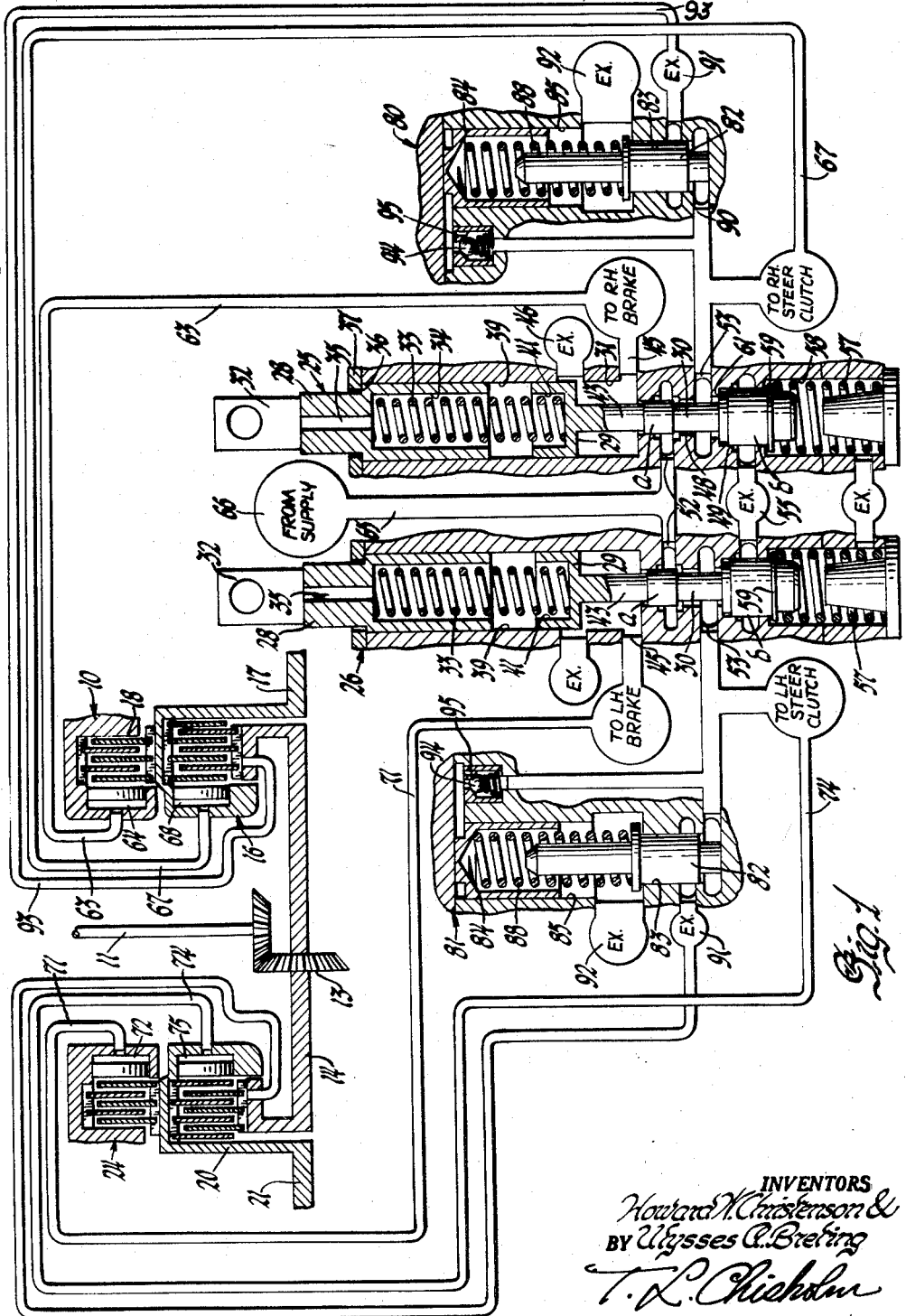
Fig. 1 is a schematic view of the transmission and the control system.

Referring to Fig. 1 the final drive transmission 10, which is shown schematically, is driven by the output shaft 11 of any suitable multiratio transmission (not shown). The shaft 11 is connected by bevel gear set 13 to the cross shaft 14 which is connected at the right side of the driving and steering fluid-operated clutch 16 to drive the wheel shaft 17. The fluid and mechanically operated brake 18 is connected to the wheel shaft 17. At the left side of the vehicle, the cross shaft 14 is connected by the driving and steering fluid-operated clutch 20 to the wheel shaft 21 which is also connected to the fluid operated brake 24. The specific construction of the clutches and brakes will be described below.

The right-hand steering control unit consisting of clutch 16 and brake 18 is controlled by the right-hand control valve 25 and the left-hand steering control unit consisting of clutch 20 and brake 24 is controlled by the left-hand control valve 26. These control valves are actuated by independent manually controlled levers which may be moved independently or in unison to control one or both of the control units. The valves 25 and 26 may also be controlled by a single lever having a linkage arranged so that the valves may be operated in unison or independently. Since the steering control valves are identical, the following detailed description of the structure and operation of these valves is made in relation to the righthand steering control valve which also applies to the lefthand valve 26 where like parts are identified with the same reference numerals.

The valve 25 consists of an actuating plunger 28, a cup member 29, and a valve element 30 located in a bore 31. The valve is actuated by a linkage connected to stem 32 of the plunger 28 which engages the spring 33 located in a hollow portion 34 of the plunger. Plunger 28 has a vent opening 35 to exhaust the space between the plunger and cup and a shoulder 36 which engages the stop 37 to limit upward movement of the plunger. The plunger 28, and cup 29 are located in a bore portion 39 of large diameter. The spring 33 fits in a recess 41 in cup 29 and normally holds the stem 43 of the cup in engagement with the valve element 30. With the valve in the normal position engaging the clutch as shown the brake apply port 45 located at the lower end of the bore 39 and the exhaust port 46 located adjacent the cup 29 are open connecting brake line 63 to exhaust to release the brake.

Valve element 30 has a small diameter land *a* and a large diameter land *b* located respectively in the bore portions 48 and 49. With the valve in the clutch engaged position shown, the main line port 52 is connected adjacent land *a* through the space between the lands *a* and *b* to the clutch port 53 located adjacent land *b* and the exhaust port 55 is blocked by land *b*. The distance between lands *a* and *b* is equal to the distance between line port 52 and exhaust port 53. A spring 57 seated in the closed end of the spring chamber portion 58 of the bore 31 engages a washer 59 on land *b* to urge valve 30 upwardly until the upper end of land *b* engages the shoulder 61 between stepped bores 48 and 49.

The right hand steer valve 25 has a brake port 45 connected by brake line 63 to the servo motor 64 of the right-hand brake 18, a main line port 52 connected by main line 65 to the fluid supply 66 and a clutch port 53 connected by the right hand clutch line 67 to the fluid motor 68 for the right-hand clutch 16. Similarly the left-hand steer control valve 26 has a brake port 45 connected by the brake line 71 to the brake motor 72, a main line port 52 connected by main line 65 to the fluid supply 66, and a clutch port 53 connected by the left-hand clutch line 74 to the left-hand clutch motor 75.

The right-and-left hand clutch lines 67 and 74 are connected respectively to the right-hand trimmer valve 80 and left-hand trimmer valve 81. Since these valves are identical, like reference numerals are used on each valve. The trimmer valve element 82 is located in a small diameter bore portion 83 and the piston 84 is located in the larger diameter bore portion 85. The piston 84 and the valve element 82 are urged by a spring 88 toward opposite ends of the closed bore 83—85. The steer clutch line 67 is connected to the port 90 at the lower end of the bore 83 and acts on the free end of valve 82. With the valve in the closed position shown, the valve 82 blocks exhaust 91 which may be connected by line 93 to the clutch controlled by the trimmer valve to supply cooling and lubricating oil to the clutch during engagement. Exhaust 92 is continuously opened to vent the space between the valve 82 and piston 84. The steer clutch line 67 is also connected through the orifice 95 to supply fluid to the end of the bore 85 to move the piston 84 toward the valve element 83 since one-way check valve 94 is closed when the clutch is applied. The one-way check valve 94 exhausts fluid from the end of bore 85 on clutch release.

Figure 2:
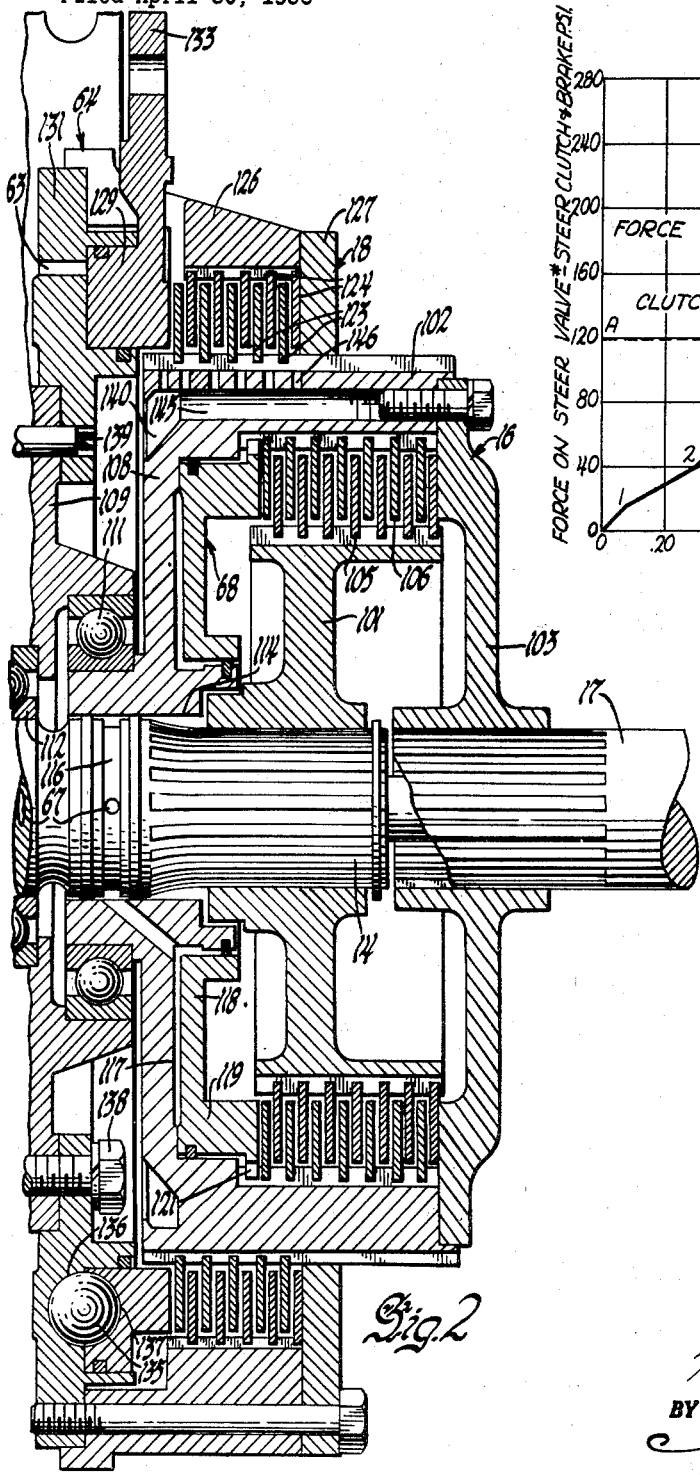
Fig. 2 shows a detailed construction of one of the clutches and brake units.

Since the right-and-left-hand driving and steering clutches 16 and 20 and the right-and-left-hand brakes 18 and 24 are similarly constructed, only the right-hand clutch 16 and brake 18 are shown in the Fig. 2. The cross shaft 14 is connected by splines to the drive hub 101. The driven housing 102 is connected by the driving hub portion 103 to the wheel shaft 17. Clutch 16 has alternate clutch plates 105 connected to the drive hub 101 and intermediate plates 106 connected to the driven housing 102. The housing 102 also has at its inboard side a centering hub 108 rotatably mounted in the transmission housing 109 by the bearing 111. The shaft 14 is rotatably mounted by a ball or roller thrust bearing 112 mounted in the housing 109 and fits within an internal bore 114 in the hub 108. Clutch line 67 extends axially through shaft 14 and radially through radial passages to the transfer groove 116 to the continuation of the line 67 in the housing 108 leading to the annular cylinder 117 formed in the hub 108. An annular piston 118 is reciprocally mounted in the cylinder 117 and has an abutment portion 119 engaging clutch plates 105 and 106 and a spline 121 engaging the splines on the clutch housing 102 so that the piston rotates with the housing. The brake 18 has an alternate series of plates 123 splined to the outer diameter of the housing 102 connected to the wheel shaft 17. The intermediate plates 124 are keyed to the brake portion 126 of the transmission housing 109. The plates 123 and 124 are located between abutment 127 at one end and annular piston 129 at the other end with a fixed plate 124 engaging the fixed abutment 127 and a rotating plate 123 connected to the wheel shaft 17 engaging the piston 129. The piston 129 is reciprocally and rotatably mounted in a cylinder 131 formed in the housing 109. The brake is actuated hydraulically by the fluid supplied by the brake line 63 to the cylinder 131 which moves the piston 129 to initiate engagement of the clutch plates. Since the piston engages the rotating plate 123, it is rotated and due to the complemental cam surfaces 136 in cylinder 131 and cam surfaces 137 in piston 129 coacting with balls 135, a further self-energized brake applying force is provided.

The brake may also be manually actuated by a suitable manual control connected by a linkage (not shown) to the lever 133 which is secured on the piston 129 to rotate the piston 129 in the same direction as the wheel shaft 17 rotates during forward movement. The series of cam balls 135 are located in complementary cam grooves 136 located in the base of the cylinder 131 and 137 located in the adjacent end of the piston 129. The cams are arranged so that on movement of the arm 133 to rotate the piston 129 in the direction of rotation of the wheel during the normal forward operation of the vehicle, the cam moves over the rotating ball to move the piston 129 to engage the brake plates 123 and 124 to apply the brake. Since piston 129 directly engaged the rotating plate 123, the plate rotates the piston to provide self-energizing action.

The brake housing portion 126 is secured to the main transmission housing by a series of bolts 138. One bolt is omitted to provide a passage for the brake line 63 which also supplies brake cooling oil through orifice 139 in a jet to the annular groove 140 which is connected by the axial passages 145 and radial passages 146 to the brake 18. The clutch plates 105—106 are cooled by oil leaking past piston 118 which will submerge the plates and is vented at the splines between hub 103 and shaft 17 or by a suitable aperture in hub 103. If the cooling line 93 is used, it is connected by passages similar to passages 146 through hub 101 and drained by radial passages (not shown) in housing 102 between passages 145.

*Operation*

When the engine is started a fluid supply 66, such as the engine driven or input driven pump of the transmission used with this final drive transmission supplies fluid under pressure to the main line 65 and ports 52 of both the right-hand control valve 25 and the left-hand control valve 26. The valves in their normal position supply oil to both of the driving and steering clutches, the right-hand one 16 and the left-hand 20 to connect the final drive transmission to drive the vehicle. The valves 25 and 26 may be moved together or independently to provide either a straight drive or a steering drive. For example, in order to make a right turn a right-hand steering and driving valve 25 is depressed to first decrease the degree of engagement of the driving clutch 16 to lessen the power transmitted to the right wheel. This will effect a moderate turn under light load conditions and a sharper turn under heavier load conditions. If a more severe turn is necessary, the valve 25 is further depressed to completely disengage the clutch 16. For extremely sharp turns or turns under downhill coasting conditions, the brake 18 is applied by further movement of the valve. Thus this valve arrangement provides a very sensitive and controllable steering arrangement for the vehicle providing a wide range of steering controlled to meet all situations encountered in vehicle operation. The vehicle is braked to stop the vehicle during normal operation by moving both valves in unison to the brake on position.

Since both the right-and-left-hand valves operate in the same manner, the details of operation of the right-hand valve described below apply to both valves.

With the valve 25 in the released position shown with the actuating plunger 28 in its uppermost position where the shoulder 36 engages the stop 37, the fluid supply 66 is connected by port 52 between the lands $a$ and $b$ of valve element 30 to the port 53 which is connected to the right-hand steer clutch line 67. The stem of valve 30 between lands $a$ and $b$ is large so that the fluid flow space between the stem and the surrounding bore 48 is small and acts as an orifice to prevent an excessive pressure drop in the main line 66 of the control system and to control the pressure rise in the clutch motor 68. As will be explained below, the pressure rise in the steer clutch servo motor 68 is also controlled by the trimmer valve 80. With the valve in this initial position, the right-hand brake line 63 is connected by port 45 between the space between the land $a$ and the cup 29 to exhaust 46 to release the brake.

Figure 3:
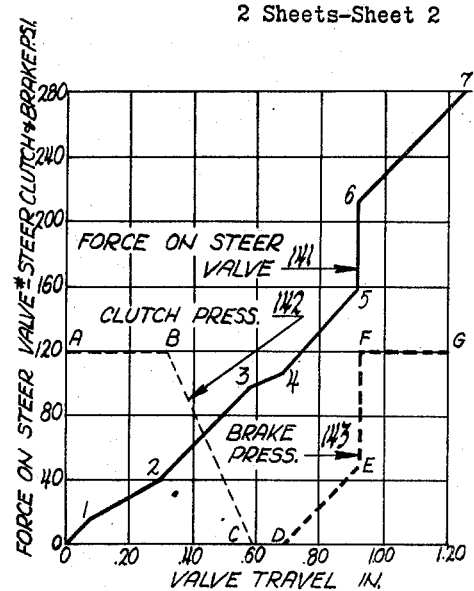
Fig. 3 is a curve illustrating the resistance to the movement of the control valve and fluid pressures supplied thereby.

In order to release the clutch and apply the brake, the valve 25 is actuated by moving the plunger 28 into the bore to reduce the clutch pressure in accordance with the curve 142 or $a$–$c$, Figure 3, and then to increase the brake pressure in accordance with the curve 143 or $d$–$g$ in Figure 3. During this travel or movement of plunger 28, the resistance to the movement of plunger 28, which is sensed by the operator, varies in accordance with the curve 141 or 0–7. In the initial valve position shown, plunger 28 is retained in the upper position by the spring 33 with the shoulder 36 abutting stop 37 and valve element 30 is held by spring 57 so that the land $b$ engages the shoulder 61 in the valve body. The initial movement of the valve plunger 28 requires a force as indicated by the portion of curve 141 between 0–1 and acts to compress spring 33 but the spring transmits insufficient force through cup 29 to the valve element 30 to compress spring 57 and move the valve element 30. Since only one spring is being compressed, the rate of increase of force required to move the plunger is large.

Further movement of the plunger 28 requires additional force but at a lower rate of increase as indicated by the portion 1–2 of curve 141 to move the plunger 28 since both springs 33 and 57 are being compressed and clutch pressure continues to act on valve element 30. The plunger transmits force through spring 33 and cup 29 to the valve element 30 to act in conjunction with a force exerted by the main line pressure acting on the unbalanced area of lands $a$ and $b$ to initiate movement of the valve element 30 and the compression of spring 57. The exhaust 46 remains open so that the brake is exhausted. During this initial movement of the valve plunger from 0–2 on curve 141, since land $a$ has not closed inlet port 52, the clutch pressure, as indicated by the portion $a$—$b$ of the curve 142, remains at line pressure.

Further movement of the valve between the points 2–3 of the curve 141 requires additional force at increased rate as indicated by the curve to move the plunger 28 to apply additional force through spring 33 to valve element 30 so that the land $a$ may close inlet port 52 and the clutch line 67 may be connected between the lands $a$ and $b$ to the exhaust port 55. Thus as the valve plunger 28 is moved from points 2 to 3 along curve 141, the clutch pressure, as shown in curve 142, is regulated at a progressively lower value from the main line pressure at $b$ to zero pressure at $c$ due to the action of springs 57 and 33 and the clutch pressure acting on the unbalanced areas of lands $a$ and $b$. It will be appreciated that as the plunger 28 moves from point 2 to point 3, spring 33 applies additional force to valve element 30 but valve element 30 remains in a substantially fixed regulating position closing inlet port 52 and exhaust port 55 and alternately cracking these ports to admit or exhaust fluid to regulate the clutch pressure inversely proportional to the additional force of spring 33. Due to the coaction of these forces acting on the valve, the force resisting movement of the plunger 28 is inversely proportional to the clutch pressure and provides the operator with a means of feeling the degree of clutch disengagement. The rate of increase in the force required to move the plunger between points 2 and 3 is greater than between points 1 and 2 since spring 57 is not being compressed.

At point 3 on the curve 141 the land $a$ positively closes the main line port 52, and clutch exhaust port 55 and brake exhaust port 46 are open so that there is no hydraulic pressure acting to engage the clutch or brake or on valve element 30 and cup 29. Thus plunger 28 moves easily due to the low rate of increase in the force required as indicated by the curve portion 3 to 4, since movement is permitted by compression of springs 33 and 57.

At point 4 land $a$ moves below main line inlet port 52 and admits fluid to the space between the land $a$ of valve element 30 and the cup 29 and the exhaust port 46 being simultaneously closed, the fluid is delivered to the brake port 45. The stem 43 is large to provide a small flow space or orifice between the stem 43 and bore portion 48 to limit the flow to the brake motor 64 and prevent an excessive pressure drop in main line 65 of the system. The fluid pressure in the bore 39, which is the same as the pressure in the brake servo motor 64 acts upwardly on cup 29 and with springs 33 and 57 resists further movement of the plunger 28 at an increasing rate, as indicated by the curve 141 between the points 4 and 5. During this movement of plunger 28 from points 4 to 5 of curve 141, the cup 29 and valve element 30 remains at a substantially fixed regulating position. The downward movement of plunger 28 increases the force of spring 33 acting on cup 29 to balance the increasing force of the fluid acting on cup 29 and the spring 57 provides through valve element 30 a constant force acting on cup 29. The cup 29 and valve element 30 move just enough from the neutral position closing exhaust 46 and line port 52 to open exhaust port 46 to decrease the pressure or open line port 52 to increase the pressure to maintain the regulated value for each position of plunger 28 as indicated by portion 4—5 of curve 141.

At point 5 of curve 141, plunger 28 engages the cup 29 to positively move the cup to connect full line pressure to the brake motor 64 as indicated by the brake pressure curve 143 between E and F. This increasing pressure acting upon the cup 29 provides the sudden increase in the force acting to resist movement of the plunger 28 as indicated by curve 141 between points 5 and 6. Further movement of the plunger 28 between points 6 and 7 of curve 141 further compresses spring 57 and thus requires additional force in accordance with the rate of this spring but does not change the pressure in the brake motor 64 which is now constant at main line pressure as indicated by the portion F—G of curve 143.

When a steering clutch is applied by the steering valves 25 and 26, the fluid flowing through the line 67 is also connected to a trimmer valve 80 or 81. These valves work in exactly the same manner and thus the operation of only the right clutch valve 80 is described herein. When pressure is initially supplied to the clutch motor 68 via line 67, it is also connected at port 90 to the trimmer valve 80. As the fluid is initially supplied, the pressure is very low due to the flow to the motor, but quickly increases to a low value controlled by a spring 88 which permits movement of valve 82 to exhaust the excess fluid through exhaust port 91. When exhaust 91 is connected by line 93 to the clutch, this excess fluid is supplied to the clutch for cooling and lubrication. Since the volume of excess fluid is large during initial clutch application and is gradually reduced during engagement and is cut off when engagement is completed, this fluid supply is ideal for clutch cooling and lubrication. This low pressure value which is built up in line 67 is also connected through orifice 95 to the other end of the valve 80. The volume of flow through orifice 95 is proportional to the pressure in line 67 and the time during which the pressure is present. The fluid flow through the orifice 95 creates a pressure in the bore 85 acting on the piston 84 to move the piston inwardly to increase the force of spring 88 acting on the valve 83 and thus increase the pressure in line 67. As the pressure in line 67 is increased, the volume of flow through orifice 95 is increased, so that the rate of increase of the pressure is progressively increased until main line pressure is attained. Thus the initial portion of clutch engagement is slow for soft clutch engagement and the final portion of the clutch engagement is fast to prevent slipping.

When the clutch motor 64 is exhausted via line 67 and port 55, the fluid in the bore 85 of the trimmer valve 80 is expelled by the spring 88 and quickly passes through the one-way check valve 94 to the clutch line 67 and then through the steer valve 25 to exhaust port 55 so that on each exhaust of the brake fluid motor, trimmer valve 80 is conditioned for another clutch application.

The above-described preferred embodiment is illustrative of the invention and as will be appreciated by those skilled in the art is subject to modification within the scope of the appended claims.

What is claimed is:

1. In a device of the character described, a drive shaft, a pair of driven shafts, a first clutch and brake unit having a fluid operated clutch connecting said drive shaft to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, means including a control valve operative to selectively control the supply of fluid from said source to each of said clutch and brake units, and having a control element movable through a plurality of positions to regulate the clutch pressure at progressively decreasing values in several of said plurality of positions, to disengage said clutch and brake, and to regulate the brake pressure at progressively increasing values in several of said plurality of positions.

2. In a device of the character described, a drive shaft, a pair of driven shafts, a first clutch and brake unit having a fluid operated clutch connecting said drive shaft to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, and means including a control valve operative to selectively control the supply of fluid from said source to said fluid operated clutch and said fluid operated brake of each of said clutch and brake units in accordance with progressive movement of said control valve through a plurality of positions, said control valve having means regulating the pressure supplied to said fluid operated brake at progressively decreasing values in a first group of positions, to disconnect said source from both said fluid operated clutch and brake in a second position and thereafter to regulate the pressure supplied from said source to said fluid operated clutch at progressively increasing values in a third group of positions.

3. In a device of the character described, a drive shaft, a pair of driven shafts, a first clutch and brake unit having a fluid operated clutch connecting said drive to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, and means including a control valve operative to selectively control the supply of fluid from said source to each of said clutch and brake units and with progressive movement to sequentially apply said clutch and disengage said brake, and having a control element movable through a plurality of positions to regulate the clutch pressure at progressively decreasing values in several of said plurality of positions, to disengage said clutch and brake, and to regulate the brake pressure at progressively increasing values in several of said plurality of positions and to apply full source pressure to said brake in a final position of said plurality of positions.

4. In a device of the character described, a drive shaft, a pair of driven shafts, a first clutch and brake unit having a fluid operated clutch connecting said drive shaft to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, a control valve means operative to control the supply of fluid from said source to each of said clutch and brake units having a control element movable through a plurality of positions in each of three ranges to regulate the clutch pressure at varying values in a first range, to disengage said clutch and brake in a second range, and to regulate the brake pressure at varying values in a third range and said control valve means having means providing a varying resistance to movement to indicate to the operator the range in which said control valve means is operating.

5. In a device of the character described, a drive shaft, a pair of driven shafts, a first clutch and brake unit having a fluid operated clutch connecting said drive shaft to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, and means including a control valve operative in response to progressive manual movement of a manual member through a plurality of positions in each of three ranges of movement requiring a varying manual force to provide operator feel to selectively control the supply of fluid from said source to each of said clutch and brake units, to regulate the clutch pressure at varying values during a first range of movement, to disengage said clutch and brake during a second range of movement, to regulate the brake pressure at varying values during a third range of movement, and said force required to move said manual member being different in said second range of movement than in said first and third ranges so the operator can sense the range being effected by the manual member.

6. In a device of the character described, a drive shaft, a pair of driven shafts, a first clutch and brake unit having a fluid operated clutch connecting said drive shaft to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, means including a control valve operative in response to progressive manual movement of a manual member through a plurality of positions in each of three ranges of movement requiring a varying manual force to provide operator feel to selectively control the supply of fluid from said source to each of said clutch and brake units, to regulate the clutch pressure at progressively decreasing values during a first range of movement having a rate of increase in the manual force required to move said manual member, to disengage said clutch and brake during a second range of movement having a rate of increase in the manual force required to move said manual member, and to regulate the brake pressure at progressively increasing values during a third range of movement having a rate of increase in the manual force required to move said manual member and said rate of increase in said second range being different from the rates of increase in said other ranges.

7. In a device of the character described, a drive shaft, a pair of driven shafts, a first clutch and brake unit having a fluid operated clutch connecting said drive shaft to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, means including a control valve operative in response to progressive manual movement of a manual member through a plurality of positions in each of five ranges of movement requiring a varying manual force to provide operator feel to selectively control the supply of fluid from said source to each of said clutch and brake units, to normally apply said clutch and disengage said brake during a first range of movement to regulate the clutch pressure at progressively decreasing values during a second range of movement to disengage said clutch and brake during a third range of movement to regulate the brake pressure at progressively increasing values during a fourth range of movement and to apply full pressure to said brake during a fifth range of movement, said manual force required to move said member having varying characteristics in each range to provide operator feel to indicate to the operator when the control valve moves from one to another range.

8. In a device of the character described, a drive shaft, a pair of driven shafts, a first clutch and brake unit having a fluid operated clutch connecting said drive shaft to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, and means including a control valve operative in response to progressive manual movement of a manual member through a plurality of positions in each of three ranges of movement requiring a varying manual force to provide operator feel to selectively control the supply of fluid from said source to each of said clutch and brake units, to regulate the clutch pressure at varying values during a first range of movement having a high rate of increase in the manual force required to move said manual member, to disengage said clutch and brake during a second range of movement having a low rate of increase in the manual force required to move said manual member, and to regulate the brake pressure at varying values during a third range of movement having a high rate of increase in the manual force required to move said manual member.

9. In a device of the character described, a drive shaft, a pair of driven shafts, a first clutch and brake unit having a fluid operated clutch connecting said drive shaft to drive one of said driven shafts and a fluid operated brake connected to stop said one driven shaft, a second clutch and brake unit having a fluid operated clutch connecting said drive shaft to drive the other of said driven shafts and a fluid operated brake connected to stop said other driven shaft, a source of fluid under pressure, and means including a control valve operative in response to progressive manual movement of a manual member through a plurality of positions in each of five ranges of movement requiring a varying manual force to provide operator feel to selectively control the supply of fluid from said source to each of said clutch and brake units, to normally apply said clutch and disengage said brake during a first range of movement having a low rate of increase in the manual force required to move said manual member, to regulate the clutch pressure at progressively decreasing values during a second range of movement having a high rate of increase in the manual force required to move said manual member, to disengage said clutch and brake during a third range of movement having a very low rate of increase in the manual force required to move said manual member, to regulate the brake pressure at progressively increasing values during a fourth range of movement having a high rate of increase in the manual force required to move said manual member and to apply full pressure to said brake during a fifth range of movement having a very high rate of increase in the manual force required to move said manual member.

10. In a valve of the character described for alternately connecting a pressure supply to two fluid means, a valve body having a stepped bore with a closed end, a valve unit having a land at one end, a small central land and a land at the other end fitting said stepped bore, manual means including a spring to apply a varying force to said one end of said valve unit, another spring located between the closed end of said bore and said other end of said valve unit, said valve unit having a normal position connecting a supply between said central and other end lands to one fluid means and connecting the other fluid means between said central and one end lands to exhaust, said valve unit being responsive to progressive movement, through a first, second and third range with a plurality of positions at least in said first and third ranges, of said manual means by a force providing operator feel, the coaction of said spring and the fluid force on said end lands to regulate the pressure supplied to said one fluid means at progressively reduced values in a first range of movement of said member to exhaust both fluid means in a second range of movement and to regulate the pressure supplied to the other fluid means at progressively increased values in a third range of movement and the force required to move said member in said second range being different so the operator can feel the range of movement of the member.

11. In a valve of the character described for alternately connecting a pressure supply to two fluid means, a valve body having a stepped bore with a closed end, a valve unit having a land at one end, a small central land and a land at the other end fitting said stepped bore, manual means including a first spring to apply a varying force to said one end of said valve unit, a second spring located between the closed end of said bore and said other end of said valve unit, said valve unit having a normal position connecting a supply between said central and other end lands to one fluid means and connecting the other fluid means between said central and one end lands to exhaust, said valve unit being responsive to progressive movement, through a first, second and third range with a plurality of positions at least in said first and third ranges, of said manual means by a force providing operator feel, and the coaction of said spring and the fluid force on the unbalanced area of said other end land to regulate the pressure supplied to said one fluid means at progressively reduced values in a first range of movement of said member having a high rate of increase of the force required to move said member to exhaust both fluid means in a second range of movement having a low rate of increase of the force required to move said member, and to regulate the pressure supplied to the other fluid means at progressively increased values in a third range of movement having a high rate of increase of the force required to move said member.

12. In a valve of the character described for alternately connecting a pressure supply to two motors, a valve having one large land at one end, a small central land and another large land at the other end, a valve body having a stepped bore for said valve with a small central portion having a supply port closable by said control land and a large portion at said one and other ends each having a continuously open motor port and an exhaust port closable by the adjacent large land successively spaced from said supply port, manual means including a first spring to apply a varying force to said one end of said valve, a second spring engaging said valve body and said other end of said valve, said valve being normally held by said springs in a first position connecting said supply port to act on the unbalanced area of said other land and to said other motor port and to connect said one motor port to said one exhaust and controllable in response to movement, through a first, second and third range with a plurality of positions at least in said first and third ranges, of said manual means to regulate the pressure supplied to said other motor port, said valve in response to movement of said manual means to a second range being movable to a second position blocking said supply port and connecting said one and other motor ports respectively to said one and other exhaust ports during movement of said manual means in said second range, and said valve in response to movement of said manual means to a third range being movable to a third position connecting said supply port to act on the unbalanced area of said one land and to said one motor port and connecting said other motor port to exhaust and controllable in response to movement of said manual means in said third range to regulate the pressure supplied to said one motor port.

13. In a valve of the character described for alternately connecting a pressure supply to two motors, a valve having one large land at one end, a small central land and another large land at the other end, a valve body having a stepped bore for said valve with a small central portion having a supply port closable by said central land and a large portion at said one and other ends each having a continuously open motor port and an exhaust port closable by the adjacent large land successively spaced from said supply port, manual means movable through a plurality of positions in a first range, through second range, and through a plurality of positions in a third range and including a first spring to apply a varying force to said one end of said valve in response to a proportional manually sensed apply force, a second spring engaging said valve body and said other end of said valve, said valve being normally held by said springs in a first position connecting said supply port to act on the unbalanced area of said other land and to said other motor port and to connect said one motor port to said one exhaust and controllable in response to progressive movement of said manual means through a plurality of positions in a first range to regulate the pressure supplied to said other motor port, said valve in response to movement of said manual means to a second range being movable to a second position blocking said supply port and connecting said one and other motor ports respectively to said one and other exhaust ports, said valve in response to movement of said manual means to a third range being movable to a third position connecting said supply port to act on the unbalanced area of said one land and to said one motor port and connecting said other motor port to exhaust and controllable in response to movement of said manual means through said plurality of positions in said third range to regulate the pressure supplied to said one motor port and means to indicate to the operator the position of said valve by variations in said apply force in each range of movement of said manual means.

14. In a valve of the character described for alternately connecting a pressure supply to two motors, a valve having one large land at one end, a small central land and another large land at the other end, a valve body having a stepped bore for said valve with a small central portion having a supply port closable by said central land and a large portion at said one and other ends each having a continuously open motor port and an exhaust port closable by the adjacent large land successively spaced from said supply port, manual means movable through a first, second and third range of movement, each of said ranges having a plurality of positions, and including a first spring to apply a varying force to said one end of said valve in response to a proportional manually sensed apply force, a second spring engaging said valve body and said other end of said valve, said valve being normally held by said springs in a first position connecting said supply port to act on the unbalanced area of said other land and to said other motor port and to connect said one motor port to said one exhaust and controllable in response to progressive movement of said manual means in a first range to regulate the pressure supplied to said other motor port at progressively reduced values, said valve in response to movement of said manual means to a second range being movable to a second position blocking said supply port and connecting said one and other motor ports respectively to said one and other exhaust ports during movement of said manual means in said second range, said valve in response to movement of said manual means to a third range being movable to a third position connecting said supply port to act on the unbalanced area of said one land and to said one motor port and connecting said other motor port to exhaust and controllable in response to movement of said manual means in said third range to regulate the pressure supplied to said one motor port at progressively increased values and said manual means in said second range of movement requiring a different rate of increase of apply force than in said first and third ranges.

15. In a valve of the character described for alternately connecting a pressure supply to two motors, a valve having one large land at one end, a small central land and another large land at the other end, a valve body having a stepped bore for said valve with a small central portion having a supply port closable by said central land and a large portion at said one and other ends each having a continuously open motor port and an exhaust port closable by the adjacent large land successively spaced from said supply port, manual means progressively moved through a first, second and third range of movement, each having a plurality of positions, and including a first spring to apply a varying force to said one end of said valve in response to a proportional manually sensed apply force, a second spring engaging said valve body and said other end of said valve, said valve being normally held by said springs in a first position connecting said supply port to act on the unbalanced area of said other land and to said other motor port and to connect said one motor port to said one exhaust and controllable in response to progressive movement of said manual means requiring a high rate of increase of apply force in a first range to regulate the pressure supplied to said other motor port at progressively reduced values, said valve in response to movement of said manual means to a second range being movable to a second position blocking said supply port and connecting said one and other motor ports respectively to said one and other exhaust ports and movement of said manual means requiring a low rate of increase of said apply force in said second range, and said valve in response to movement of said manual means to a third range being movable to a third position connecting said supply port to act on the unbalanced area of said one land and to said one motor port and connecting said other motor port to exhaust and controllable in response to movement of said manual means requiring a high rate of increase of said apply force in said third range to regulate the pressure supplied to said one motor port at progressively increased values.

16. In a hydraulic control system, a pair of friction members, motor means operated by fluid under pressure to engage said friction members, a source of fluid under pressure, a valve bore having a supply port and a motor port, a line connecting said source to said supply port and a line connecting said motor port to said motor means, said lines having a large cross section area, a valve having a pair of spaced lands located in said bore and connected by a stem substantially as large as said bore to provide a restricted passage of small cross sectional area to at times connect said ports to supply a restricted flow of fluid to said motor means to slowly engage said friction members and prevent an excessive pressure drop at said source.

17. In a drive mechanism an input member, an output member, means connecting said members and controlling said output member including a pair of alternately operable fluid motor devices, a source of fluid under pressure, control valve means for connecting said source alternately to one or another of said fluid motor devices including a valve element having a first and a second unbalanced area, resilient means comprising a first spring urging said valve element in one direction and a second spring urging said valve in the opposite direction and normally biasing said valve element to urge said valve element against the fluid force acting on said first unbalanced area to a first position connecting said source through a restricted port to said one fluid motor device and to said first unbalanced area to urge said valve in a direction opposing said first spring, operating means engaging said second spring and movable from a first position to increase the force applied by said second spring to said valve element to tend to move said valve element toward a second position closing said restricted port and connecting said one fluid motor device to exhaust to provide a controlled reduction of fluid pressure to zero in one of said fluid motor devices proportional to increased reaction on said operating means, and continued movement of said operating means increasing the force applied to said valve element by said second spring moving said valve element from said second position connecting said source through said second port to said other fluid motor device and to said second unbalanced area to provide increasing fluid pressure to supply fluid pressure to said other fluid motor device increasing proportional to the resistance to movement of said operating means.

18. In a device of the character described, a source of fluid under pressure, a control valve having a first and second controlled pressure port operable to selectively control the supply of fluid from said source to said first and second port in accordance with progressive movement of said control valve through a plurality of positions, said control valve having means regulating the pressure supplied to said first port at progressively decreasing values in a first group of positions, to disconnect said source from both said fluid operated ports in a second position and thereafter to regulate the pressure supplied to said second port at progressively increasing values in a third group of positions.

19. In a device of the character described, a source of fluid under pressure, a control valve having a supply port connected to said source and a first and second controlled pressure port, means operable to control said ports to selectively control the supply of fluid from said supply port to said first and second pressure port in accordance with progressive movement of said control valve through a plurality of positions, a control member movable through a plurality of positions operatively connected to said control valve, said control valve having means regulating the pressure supplied to said first port at progressively decreasing values in response to the position of said control member in a first group of positions, to disconnect said source from both said fluid operated ports when said control member is in a second position and regulating the pressure supplied to said second port at progressively increasing values in response to the position of said control member in a third group of positions.

20. In a hydraulic control system, drive establishing means, motor means operated by fluid under pressure to engage said drive establishing means, a source of fluid under pressure, a valve bore having a supply port, a motor port, and an exhaust port, a line connecting said source to said supply port and a line connecting said motor port to said motor means, said lines having a large cross sectional area, a valve member movably mounted in said valve bore having a stem and three spaced lands on said stem, the central land in the neutral position blocking flow from said supply port to said valve bore, said valve member having a supply position connecting said supply port through a first space between said stem and bore between a pair of lands to said motor port, said stem in said first space having a large diameter as compared to the diameter of said bore to provide a restricted passage of small cross sectional area to restrict flow from said supply port to said motor port to restrict the supply of fluid to said motor means to slowly actuate said motor means and drive establishing means, and said valve member having an exhaust position connecting said motor port to said exhaust port through a second space between said stem and bore between the other pair of lands, said stem in said second space having a small diameter as compared to the diameter of said bore to provide a large cross sectional area passage between said motor port and said exhaust port to permit unrestricted flow of fluid from said motor means to quickly actuate said motor and said drive engaging means.

21. In a hydraulic control system, drive establishing means, motor means operated by fluid under pressure to engage said drive establishing means, a source of fluid under pressure, valve means including a bore having a supply port, a motor port, and an exhaust port, a line connecting said source to said supply port and a line connecting said motor port to said motor means, said lines having a large cross sectional area, said valve means including a valve member movably mounted in said bore, said valve means in the supply position of said valve member providing a restricted passage of small cross sectional area to restrict flow from said supply port to said motor port to restrict the supply of fluid to said motor means to slowly actuate said motor means and drive establishing means, and said valve means in the exhaust position of said valve member providing a large cross sectional area passage between said motor port and said exhaust port to permit unrestricted flow of fluid from said motor means to quickly actuate said motor and said drive engaging means.

22. In a hydraulic control system, drive establishing means, motor means operated by fluid under pressure to engage said drive establishing means, a source of fluid under pressure, valve means including a bore having a supply port, a motor port, and an exhaust port, a line connecting said source to said supply port and a line connecting said motor port to said motor means, said lines having a large cross sectional area, said valve means including a valve member movably mounted in said bore, and said valve means in the supply position of said valve member providing a restricted passage of small cross sectional area to restrict flow from said supply port to said motor port to restrict the supply of fluid to said motor means to slowly actuate said motor means and drive establishing means.

23. In a device of the character described, a drive member, a driven member, drive means connecting said members, a first and a second fluid operated means operatively connected to control said drive means, a source of fluid under pressure, a control valve having a first and second controlled pressure port operable to selectively control the supply of fluid from said source to said first and second port in accordance with progressive movement of said control valve through a plurality of positions, said control valve having means regulating the pressure supplied to said first port at progressively decreasing values in a first group of positions, to disconnect said source from both said ports in a second position and thereafter to regulate the pressure supplied to said second port at progressively increasing values in a third group of positions, a first line connecting said first port to said first fluid operated means and a second line connecting said second port to said second fluid operated means to alternatively operate said first and second fluid operated means.

24. In a device of the character described, a drive member, a driven member, drive means connecting said members, a first and a second fluid operated means operatively connected to control said drive means, a source of fluid under pressure, a control valve having a first and second controlled pressure port operable to selectively control the supply of fluid from said source to said first and second port in accordance with progressive movement of said control valve through a plurality of positions, said control valve having means regulating the pressure supplied to said first port at progressively decreasing values from the first to the last position in a first group of positions and to exhaust said second port in substantially all of said positions of said first group of positions, and thereafter to regulate the pressure supplied to said second port at progressively increasing values from a first to the last positions in a second group of positions and to exhaust said first port in substantially all of said positions of said first group of positions, a first line connecting said first port to said first fluid operated means and a second line connecting said second port to said second fluid operated means to alternatively operate said first and second fluid operated means.

25. In a transmission, a fluid operated drive controlling device, a source of fluid under pressure, a manually actuated control and regulator valve operative to connect said source to said fluid operated drive controlling device and to regulate the pressure of the fluid supplied to said fluid operated drive controlling device at progressively increasing pressure values in accordance with progressive movement through group of positions by an operator and an automatic pressure control valve connected to said fluid operated drive controlling device operative to automatically control the pressure in said fluid operated drive controlling device at a low value on the initiation of the supply of fluid under pressure from said source to said fluid operated drive controlling device by said manually actuated control and regulator valve and to limit the rate of increase of pressure permissible under manual operation of said manually actuated control and regulator valve to predetermined values.

References Cited in the file of this patent

UNITED STATES PATENTS

| | | |
|---|---|---|
| 2,049,487 | Beeh | Aug. 4, 1936 |
| 2,245,988 | Lambert | June 17, 1941 |
| 2,344,933 | Lambert | Mar. 21, 1944 |
| 2,381,651 | Dickens | Aug. 7, 1945 |
| 2,392,423 | Stephens | Jan. 8, 1946 |
| 2,433,443 | Edge | Dec. 30, 1947 |
| 2,472,694 | Chouings | June 7, 1949 |
| 2,648,415 | Neighbour et al. | Aug. 11, 1953 |
| 2,656,904 | Grenier | Oct. 27, 1953 |
| 2,702,618 | Baker et al. | Feb. 22, 1955 |
| 2,721,640 | De Feo et al. | Oct. 25, 1955 |
| 2,757,513 | Banker | Aug. 7, 1956 |
| 2,781,858 | Kelley et al. | Feb. 19, 1957 |
| 2,807,968 | Forster | Oct. 1, 1957 |
| 2,809,536 | O'Malley | Oct. 15, 1957 |